J. Watt.
Combined Heating Furnace and Boiler.
No. 3,529. Reissued Jun. 29, 1869.
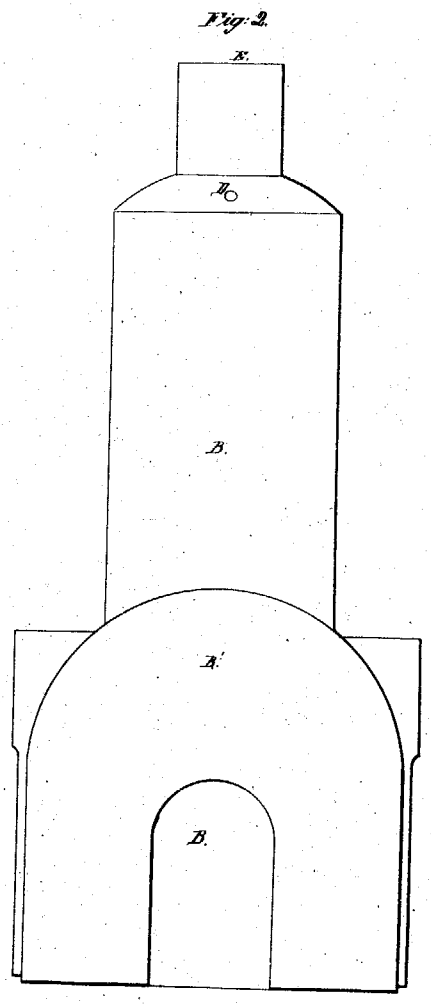
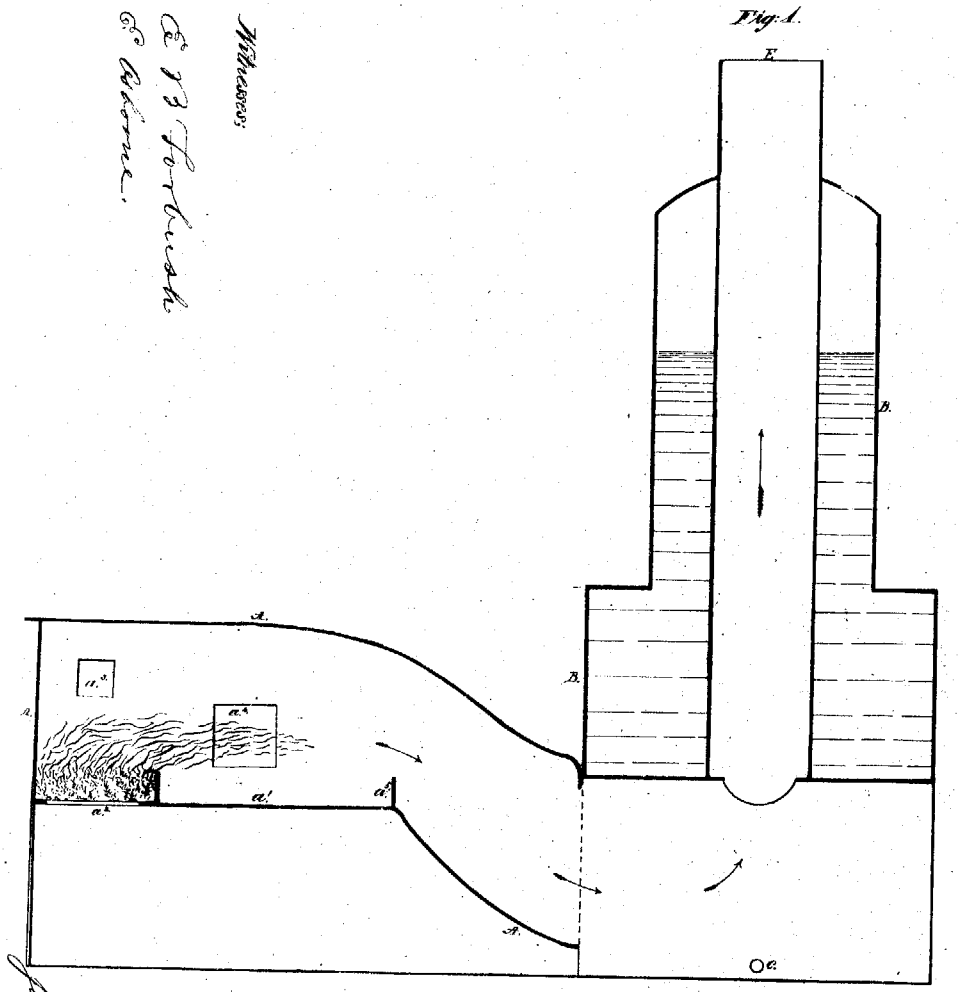
Witnesses;
E B Forbush
E. Osborne.
Inventor.
James Watt

UNITED STATES PATENT OFFICE.

JAMES WATT, OF CHARLESTOWN, MASSACHUSETTS, AND HENRY CHILDS, OF BUFFALO, NEW YORK, ASSIGNEES OF JAMES WATT.

IMPROVEMENT IN UTILIZING WASTE HEAT OF PUDDLING FURNACES, &c., IN GENERATING STEAM.

Specification forming part of Letters Patent No. 38,521, dated May 12, 1863; Reissue No. 3,529, dated June 29, 1869.

*To all whom it may concern:*

Be it known that JAMES WATT, of Charlestown, in the county of Middlesex and State of Massachusetts, did invent a certain new and useful improvement in combined heating or puddling furnace and boiler, of which the following is a full, clear, and exact description, reference being had to the accompanying drawings, making a part of this specification, in which—

Figure I is a vertical longitudinal section. Fig. II is an end elevation.

Letters of like name and kind refer to like parts in each of the figures.

The nature of this invention consists, first, in the combination and arrangement of the steam-generator at the end of the puddling or heating furnace, whereby the waste heat from the furnace and the heat of the slag formed in the furnace may be used to heat the water in the boiler to furnish steam to drive the machinery used in connection therewith; second, in the construction of the boiler so that it will form the neck of the furnace and surround the same with a water-jacket, whereby the metal will be protected from injury by the heat, and the neck be rendered more durable, and therefore cheaper, than when built of fire-brick.

A represents a furnace of ordinary construction, which may be a puddling, heating, or other furnace.

$a'$ is the hearth; $a^2$, the grate upon which the fuel is laid; $a^3$, door for supplying fuel; $a^4$, door opening onto the hearth. The bridge $a^5$ has apertures through it to allow the slag to run down into the fire-chamber of the boiler.

B represents the boiler. This has a large base, which is so made as to form an arched combustion-chamber within, constituting the neck or throat of the furnace, as shown at B′, Fig. II. The boiler is located at the end of the furnace, standing upon a horizontal plane with the furnace.

One object in locating the boiler at the end of the furnace and upon a horizontal plane therewith is, that the surplus heat and slag from the furnace may be easily directed into a fire-chamber within the boiler, thereby saving nearly all the surplus heat from the furnace, and also the heat of the slag for making steam. This location is also more convenient and economical than if a boiler is located above the furnace, as heretofore. It is more convenient in saving room, and is also more economical in the saving and use of the surplus heat for making steam, besides the additional advantage in gaining heat from the slag.

The chamber B′, or neck of the furnace, being covered at the sides and top by water, is protected from the effects of the heat to which it is subjected, and thus prevented from burning out, as is the case in furnaces as ordinarily constructed, in which the neck is built of fire-brick. The frequent rebuilding of the neck of a furnace, which is required when no such protection is provided, involves not only the expense of the fire-brick employed and the labor required, but also the loss of time and fuel incident to the stoppage of the furnace. The greater part of this loss and expense is avoided by my improved construction.

The fire-chamber B′ has a door or is walled up with fire-brick at its outer end, which gives easy access to the interior of the fire-chamber and boiler for cleaning or repairing.

E is the chimney; C, an opening or lock for the admission of water into the boiler, and D an opening for the steam pipe or valve. The arrows show the course which the flame and smoke take in passing from the furnace through the boiler.

What is claimed as the invention of the said WATT is—

1. The arrangement of the boiler at the end of the furnace, and on a horizontal plane therewith, so that the surplus heat and slag from the furnace may be directed into a fire-chamber, B′, within the boiler, substantially as described.

2. The combination of the neck of the puddling or heating furnace with the water-jacket of the boiler, substantially as set forth.

JAMES WATT.
HENRY CHILDS.

Witnesses:
T. A. LANGWORTHY,
JAY HYATT.